US012734519B2

(12) United States Patent
Ingham et al.

(10) Patent No.: US 12,734,519 B2
(45) Date of Patent: Sep. 15, 2026

(54) MICRODROPLET MANIPULATION DEVICE

(71) Applicant: Lightcast Discovery Ltd, Cambridge (GB)

(72) Inventors: Richard Jeremy Ingham, Cambridge (GB); Jasmin Kaur Chana Conterio, Cambridge (GB); Thomas Henry Isaac, Cambridge (GB)

(73) Assignee: Lightcast Discovery Ltd, Cambridge (GB)

( * ) Notice: Subject to any disclaimer, the term of this patent is extended or adjusted under 35 U.S.C. 154(b) by 989 days.

(21) Appl. No.: 17/431,924

(22) PCT Filed: Feb. 19, 2020

(86) PCT No.: PCT/GB2020/050391
§ 371 (c)(1),
(2) Date: Aug. 18, 2021

(87) PCT Pub. No.: WO2020/169965
PCT Pub. Date: Aug. 27, 2020

(65) Prior Publication Data

US 2022/0143607 A1 May 12, 2022

(30) Foreign Application Priority Data

Feb. 19, 2019 (EP) .................................... 19158079

(51) Int. Cl.
*B01L 3/00* (2006.01)

(52) U.S. Cl.
CPC ..... *B01L 3/502715* (2013.01); *B01L 3/50273* (2013.01); *B01L 3/502784* (2013.01);
(Continued)

(58) Field of Classification Search
CPC .......... B01L 3/502715; B01L 3/50273; B01L 3/502784; B01L 3/502761
(Continued)

(56) References Cited

U.S. PATENT DOCUMENTS 6,565,727 B1 5/2003 Shenderov
2003/0224528 A1 12/2003 Chiou et al.
(Continued)

FOREIGN PATENT DOCUMENTS

WO 2018/234445 12/2018
WO 2018/234446 12/2018
(Continued)

OTHER PUBLICATIONS

International Search Report issued Mar. 19, 2020 in International (PCT) Application No. PCT/GB2020/050391, 4 pages.
(Continued)

*Primary Examiner* — Stephone B Allen
*Assistant Examiner* — Boutsikaris Leonidas
(74) *Attorney, Agent, or Firm* — Porter Wright Morris & Arthur LLP

(57) ABSTRACT

A device for manipulating microdroplets comprises a microfluidic chip adapted to receive and manipulate microdroplets dispersed in a carrier fluid flowing along pathways therethrough characterised in that chip includes regions of differing or zero microdroplet fluid flow rates. Also disclosed is an electrowetting means of transporting emulsions and components of emulsions between the different flow regions.

13 Claims, 1 Drawing Sheet

(52) U.S. Cl.
CPC ... *B01L 2200/0668* (2013.01); *B01L 2200/10* (2013.01); *B01L 2300/0636* (2013.01); *B01L 2300/0645* (2013.01); *B01L 2300/0654* (2013.01); *B01L 2300/089* (2013.01); *B01L 2300/0896* (2013.01); *B01L 2300/165* (2013.01); *B01L 2400/0427* (2013.01); *B01L 2400/043* (2013.01)

(58) Field of Classification Search
USPC .......................................................... 359/290
See application file for complete search history.

(56) References Cited

U.S. PATENT DOCUMENTS

| | | | | |
|---|---|---|---|---|
| 2012/0091003 | A1 | 4/2012 | Chuang et al. | |
| 2013/0143312 | A1 | 6/2013 | Wheeler et al. | |
| 2013/0233425 | A1 | 9/2013 | Srinivasan et al. | |
| 2015/0027889 | A1 | 1/2015 | Pollack et al. | |
| 2015/0107995 | A1* | 4/2015 | Sista | B01L 3/502792 204/450 |
| 2015/0253284 | A1 | 9/2015 | Sudarsan et al. | |
| 2015/0298125 | A1 | 10/2015 | Ermakov | |
| 2016/0158748 | A1* | 6/2016 | Wu | B01L 3/50273 422/504 |
| 2016/0160259 | A1 | 6/2016 | Du | |
| 2022/0219173 | A1* | 7/2022 | Isaac | C12Q 1/6869 |
| 2023/0201836 | A1* | 6/2023 | Frayling | B01L 3/502792 422/502 |

FOREIGN PATENT DOCUMENTS

| | | | | |
|---|---|---|---|---|
| WO | 2018/234448 | | 12/2018 | |
| WO | WO-2018234446 | A1 * | 12/2018 | B01L 3/5027 |
| WO | WO-2018234448 | A1 * | 12/2018 | B01L 3/502784 |

OTHER PUBLICATIONS

Written Opinion of the International Searching Authority issued Mar. 19, 2020 in International (PCT) Application No. PCT/GB2020/050391, 7 pages.
Pei, Shao Ning, "Optofluidic Devices for Droplet and Cell Manipulation" Electronic Theses and Dissertations Uc Berkeley, 2015, XP055396057, 107 pages.
Goossens et al., "Differential microRNA expression analysis in blastocysts by whole mount in situ hybridization and reverse transcription quantitative polymerase chain reaction on laser capture microdissection sample" Analytical Biochemistry, 2012, vol. 423, pp. 93-101.
Spiegelaere et al., "Single-Cell Analysis", Methods in Molecular Biology, vol. 853, Chapter 4, pp. 29-37, 239 pages
Chiou et al., "Continuous optoelectrowetting for picoliter droplet manipulation", Applied Physics Letters, 2008, vol. 93 pp. 221110-1-221110-3, 4 pages.

* cited by examiner

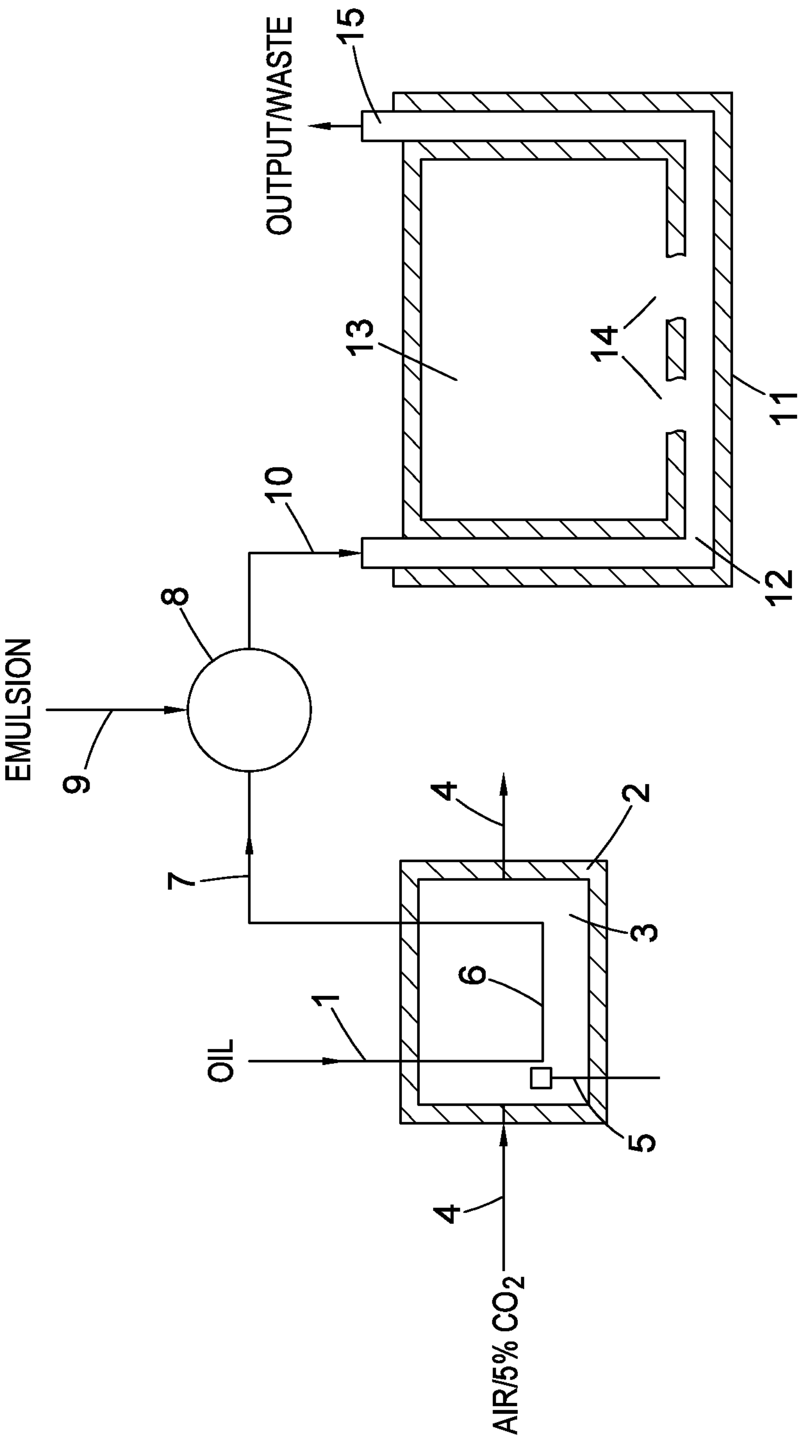
OUTPUT/WASTE
15
13
14
11
10
12
8
EMULSION
9
4
2
7
3
6
1
OIL
5
4
AIR/5% $CO_2$

MICRODROPLET MANIPULATION DEVICE

This invention relates to a microfluidic chip suitable for the manipulation of an emulsion of microdroplets and carrier fluid wherein the constituent parts of the emulsion can be manipulated independently by subjecting the emulsions to regions of differing flow, combined with selectively applied holding forces.

Devices for manipulating droplets or magnetic beads have been previously described in the art; see for example U.S. Pat. No. 6,565,727, US20130233425 and US20150027889. In the case of droplets, this outcome may be typically achieved by causing the droplets, for example in the presence of an immiscible carrier fluid, to travel through a microfluidic space defined by two opposed walls of a cartridge or microfluidic tubing. Embedded within one or both walls are microelectrodes covered with a dielectric layer each of which is connected to an A/C biasing circuit capable of being switched on and off rapidly at intervals to modify the electric field characteristics of the layer. This gives rise to localised directional capillary forces in the vicinity of the microelectrodes which can be used to steer the droplet along one or more predetermined pathways. Such devices, which employ what hereinafter and in connection with the present invention will be referred to as 'real' electrowetting electrodes, are known in the art by the acronym EWOD (Electrowetting on Dielectric) devices.

A variant of this approach, in which the electrowetting forces are optically-mediated, known in the art as optoelectrowetting and hereinafter the corresponding acronym OEWOD, has been disclosed in, for example, US20030224528, US20150298125, US20160158748, US20160160259 and Applied Physics Letters 93 221110 (2008). In particular, the first of the four patent applications discloses various microfluidic devices which include a microfluidic cavity defined by first and second walls and wherein the first wall is of composite design and comprised of substrate, photoconductive and insulating (dielectric) layers. In this embodiment, between the photoconductive and insulating layers is disposed an array of conductive cells which are electrically isolated from one another and coupled to the photoactive layer and whose functions are to generate corresponding electrowetting electrode locations on the insulating layer. At these locations, the surface tension properties of the droplets can be modified by means of an electrowetting field as described above. These conductive cells may then be temporarily switched on by light impinging on the photoconductive layer. This approach has the advantage that switching is made much easier and quicker although its utility is to some extent still limited by the arrangement of the electrodes. Furthermore, there is a limitation as to the speed at which droplets can be moved and the extent to which the actual droplet pathway can be varied.

Double-sided embodiments of this latter approach have been disclosed in University of California at Berkeley thesis UCB/EECS-2015-119 by Pei. In one example, a device is described which allows the manipulation of relatively large droplets in the size range 100-500 μm using optoelectrowetting across a surface of Teflon AF deposited over a dielectric layer using a light-pattern over electrically-biased amorphous silicon. However, in the devices exemplified the dielectric layer is thin (100 nm) and only disposed on the wall bearing the photoactive layer.

Recently, in our pending application EP17177204.9 we have described a device for manipulating microdroplets which uses optoelectrowetting to provide the motive force. In this OEWOD device, the microdroplets are translocated through a microfluidic space defined by containing walls; for example, a pair of parallel plates having the microfluidic space sandwiched therebetween. At least one of the containing walls includes what are hereinafter referred to as 'virtual' electrowetting electrodes locations which are generated by selectively illuminating an area of a semiconductor layer buried within. By selective illumination of the layer with light from a separate light source, a virtual pathway of virtual electrowetting electrode locations can be generated transiently along which the microdroplets can be caused to move. In our corresponding application EP17180391.9, use of this device as an operative part of a nucleic acid sequencer is described.

We have now found that in some instances it is highly desirable to be able to move the microdroplets between regions of differing and in some cases zero flow so that, for example, certain microdroplets can be separated and trapped in different regions; for example where they can be temporarily stored for the purpose of incubating chemical or enzymatic reactions occurring therein, or for another example where they can be held in a particular position whilst a carrier or fluid or a second emulsion is caused to flow in to the microfluidic chip. This latter example is useful for cell culture, whereby cell-containing microdroplets are held in place whilst a continuous phase flow containing dissolved nutrients and gases is flowed over the microdroplets. Yet another example application of the invention is the manipulation and inspection of male and female gametes during in-vitro fertilization workflows.

Thus, according to the present invention, there is provided a device for manipulating microdroplets comprising a microfluidic chip adapted to receive and manipulate microdroplets dispersed in a carrier fluid flowing along pathways therethrough characterised in that chip includes regions of differing or zero carrier fluid flow rates.

In one embodiment of the invention, the microfluidic chip includes one or more locations for holding the microdroplets in a stationary position by means of a holding force; for example, by the application of an electrowetting force. In another, the electrowetting force that is employed is optically mediated (OEWOD) and employs virtual electrodes of the type described above or below. In yet another embodiment, the chip further includes a means for transferring the microdroplets between the various regions. Preferably, such transference means comprises a pathway of real or virtual electrowetting locations along which the microdroplets or selected microdroplets can be caused to move.

In the case where droplets are kept stationary by virtue of being in a region of low fluid flow or by being held by an external force such as an (opto)electrowetting force, or by a combination of the two aforementioned effects, it is then possible to control the flow of the continuous phase using an external pumping force without displacing the droplets from their holding locations. This operation has the beneficial effect of allowing the continuous phase to be exchanged around the target droplets. In a biological cell culturing system where the continuous phase contains dissolved gases and nutrients that are depleted through the metabolic activity of biological cells encapsulated inside the target droplets, it is advantageous to replenish the depleted continuous phase by causing new material to flow in from outside the microfluidic. In the same manner, the transfer of dissolved materials between the continuous phase and the microdroplets can modify the pH of the droplets. For reagents such as buffered cell culture media, where the pH of the media is ordinarily regulated by the concentration of carbon dioxide in gas phase surrounding the media, it is possible to use the controlled introduction of carrier phase that has been externally equilibrated with the desired gas phase to form a transport pathway between the culture media in the droplet and the gas phase.

This mechanism whereby the droplets held in low-flow regions in the chip are resupplied by flowing carrier phase is particularly advantageous for situations where the carrier phase has a very high saturation capacity for solutes such as carbon dioxide and oxygen, but a relatively low saturation capacity for aqueous materials. This leads to a low rate of dissolution of aqueous droplets in to the oil phase, but an efficient replenishment of dissolved gases from the continuous phase into the microdroplets. In this manner it is possible to retain a population of cells in a viable, proliferating state inside the microdroplets without restricting their access to required gases such as oxygen and carbon dioxide and without diminishing the volume of the cell-containing microdroplets.

In the case where an analyte from inside the microdroplets is soluble in the continuous phase, it is possible to extract a sample of the analyte through flow of the continuous phase without displacing the microdroplets. Similarly, it is possible to use the flow of the continuous phase to introduce an external reagent to the microdroplets.

In an example embodiment, the continuous phase flow is caused to stop by turning off a fluid pump and closing valves. Cells incubated inside the droplets secrete compounds which then diffuse spontaneously from the droplets in to the continuous phase. In some cases the diffusion is augmented through use of optical electrowetting forces to stir the droplet. A sample of the continuous phase which has accumulated material secreted from the droplets can be recovered from the device by re-activating the pumps and opening the relevant valves. This process can also be operated in reverse, whereby material(s) dissolved in the continuous phase can be supplied to the droplets. This can take the form of batch-wise flow whereby a moiety of the continuous phase is left to incubate in the space around the droplets, having been introduced by the activation of fluid pumps. This can also take the form of constant flow whereby a stream of the continuous phase flows past the droplets. Uptake of material from the continuous phase to the droplets and the cells contained inside can be through passive diffusion, osmosis or Ostwald ripening.

As well as causing the flow of the continuous phase, it is possible to cause the flow of a secondary emulsion of microdroplets from outside the chip whilst some previous droplets are held stationary using the low-flow regions and electrowetting forces. It is then possible to cause the droplets from the secondary emulsion to be captured in to the low flow regions in a similar manner to the first emulsion. This process can be repeated with a third emulsion and so-on. In this manner it is possible to sequentially load a series of different emulsions in to the microfluidic chip with only a single inlet.

As mentioned above, in some embodiments, the invention may be applied in the manipulation and inspection of male and female gametes during in-vitro fertilization workflows.

For example, using the instrument it is possible to conduct inspection, selection and assaying steps on male gamete cells, such as human or animal sperm cells. In one example procedure, a sample of sperm cells is prepared from diluted semen and encapsulated in to droplets. Droplets are loaded on to the chip and then inspected using brightfield microscopy. Those droplets which contain no gametes are then discarded, and any containing sperm cells are retained for inspection. Once a sample of gametes is selected for analysis, videos are taken of the gametes along with still images. Pattern recognition algorithms applied to the videos enable characterisation of the gametes for motility, body morphology and nucleus morphology. The results of this characterisation can be mapped on to a particular droplet which is then retrieved for further processing. This processing can include assaying steps on-chip such as the addition of reporter reagents or it could include recovery off-chip for use in in-vitro fertilisation processes or for genetic analysis In another example, by encapsulating a female gamete such as a human or animal ovum, it is possible to conduct fertilisation of the ovum. Similarly to the male gamete it is possible to encapsulate the female gamete in a droplet and load in to the chip. Once on the device the cell can be inspected for defects in morphology, or assayed with reporter reagents. After inspection or assaying, the female gamete cell could be subjected to optional processing steps, such as the removal of germinal epithelium cells through mechanical shear applied via droplet motion or through the addition of further reagents.

In yet another example, by loading male and female gametes onto a single microfluidic device, it is possible to merge droplets containing the two gametes together and cause them to combine. In one example application a large number of male gamete droplets are merged with a single ovum; conventional interactions between the gametes lead to fertilisation and generation of a blastocyst on-chip. In another example, a single selected male gamete and a single selected and processed female gamete are combined on-chip and are caused to interact.

In another example application, gametes of both sexes are recovered from the microfluidic chip, and are combined using conventional handling techniques known the art such as ICSI or IVF.

In some embodiments, blastocysts, which may be formed through the methods detailed above, or through the conventional means known in the art, can also be encapsulated in droplets and cultured on-chip. On chip culturing allows for the inspection of the blastocyst during formation, using the imaging and detection systems described below. Using droplet merging operations the blastocyst environment can be controlled through the addition of extra materials such as buffer solutions, salts, nutrients, proteins and extracellular matrix materials. During blastocyst formation it is often desirable to use techniques such as laser microdissection to remove a sample of cells from the blastocyst and recover them for further analysis. In some embodiments, the blastocyst is transported to a droplet manipulation zone. This manipulation zone may comprise a physical feature on the microfluidic chip, such as a pillar, post, a physical restriction between the electrowetting plates or a wedge-shaped variation in the gap between the electrowetting plates such as is described in PCT/EP2019/062791, the disclosure of which is incorporated by reference herein. Once a blastocyst is loaded in to the manipulation zone it is effectively held immobile. Laser microdissection can then proceed as described in the literature (Spiegelaere et al. (2012). *Methods Mol. Biol.*, vol 853, pp 29-37; Goossens et al. (2012). *Anal. Biochem.*, vol 423(1), pp 93-101) in order to remove a portion of the blastocyst. Once a portion of the droplet is excised, droplet splitting operations as described herein can be used to separate the sample portion from the blastocyst. Through repeated splitting and re-merging operations and machine-vision inspection of the distribution of material between the two droplets after splitting, it is possible to verify that the blastocyst and the sample portion have been correctly separated. After separation the sample portion of the blastocyst can be recovered for further analysis, such as through a genetic test including polymerase chain reaction or DNA sequencing.

As regards the microfluidic chip itself, this is preferably comprised of the various regions and optionally an optical detection system linked together by a series of microfluidic pathways; delineated for example by one or more microfluidic channels, tubes or pathways disposed on a substrate or between substrate walls. In one embodiment, these pathways include real or virtual electrowetting electrode locations along which the microdroplets may be driven by pneumatic and/or electrowetting forces. Furthermore, the various regions and optical detection system may further include more such electrode locations. In another embodiment these pathways may include in-plane or out-of-plane constrictions which have dimensions such that the carrier phase can flow through the constrictions unimpeded, but the droplets cannot pass through the constrictions.

In a preferred embodiment of the chip, the electrowetting electrodes are virtual and established in the microfluidic pathways and/or the regions by means of one or more OEWOD structures. In one embodiment, these OEWOD structures are comprised of:

- a first composite wall comprised of:
  - a first substrate
  - a first conductor layer on the substrate having a thickness in the range 70 to 250 nm;
  - a photoactive layer activated by electromagnetic radiation in the wavelength range 400-1000 nm on the conductor layer having a thickness in the range 300-1500 nm and
  - a first dielectric layer on the photoactive layer having a thickness in the range 30 to 160 nm;
- a second composite wall comprised of:
  - a second substrate;
  - a second conductor layer on the substrate having a thickness in the range 70 to 250 nm and
  - optionally a second dielectric layer on the conductor layer having a thickness in the range 30 to 160 nm wherein the exposed surfaces of the first and second dielectric layers are disposed at least 10 μm apart to define a microfluidic space adapted to contain microdroplets;
- an A/C source to provide a voltage across the first and second composite walls connecting the first and second conductor layers;
- at least one source of electromagnetic radiation having an energy higher than the bandgap of the photoexcitable layer adapted to impinge on the photoactive layer to induce corresponding virtual electrowetting electrode locations on the surface of the first dielectric layer and
- means for manipulating the points of impingement of the electromagnetic radiation on the photoactive layer to vary the disposition of the virtual electrowetting electrode locations thereby creating at least one optically-mediated electrowetting pathway along which the microdroplets may be caused to move.

In one embodiment, the first and second walls of the structures are transparent with the microfluidic space sandwiched in-between. In another, the first substrate and first conductor layer are transparent enabling light from the source of electromagnetic radiation (for example multiple laser beams or LED diodes) to impinge on the photoactive layer. In another, the second substrate, second conductor layer and second dielectric layer are transparent so that the same objective can be obtained. In yet another embodiment, all these layers are transparent.

Suitably, the first and second substrates are made of a material which is mechanically strong for example glass, metal, silicon or an engineering plastic. In one embodiment, the substrates may have a degree of flexibility. In yet another embodiment, the first and second substrates have thicknesses in the range 100-1000 μm.

The first and second conductor layers are located on one surface of the first and second substrates and are typically have a thickness in the range 70 to 250 nm, preferably 70 to 150 nm. In one embodiment, at least one of these layers is made of a transparent conductive material such as Indium Tin Oxide (ITO), a very thin film of conductive metal such as silver or a conducting polymer such as PEDOT or the like. These layers may be formed as a continuous sheet or a series of discrete structures such as wires. Alternatively, the conductor layer may be a mesh of conductive material with the electromagnetic radiation being directed between the interstices of the mesh.

The photoactive layer is suitably comprised of a semiconductor material which can generate localised areas of charge in response to stimulation by electromagnetic radiation. Examples include undoped hydrogenated amorphous silicon layers having a thickness in the range 300 to 1500 nm. In one embodiment, the photoactive layer is activated using visible light.

The photoactive layer, in the case of the first wall and optionally the conducting layer in the case of the second wall, are coated with a dielectric layer which is typically in the thickness range from 30 to 160 nm. The dielectric properties of this layer preferably include a high dielectric strength of >10^7 V/m and a dielectric constant of >3. Preferably, it is as thin as possible consistent with avoiding dielectric breakdown. In one embodiment, the dielectric layer is selected from alumina, silica, hafnia or a thin non-conducting polymer film.

In another embodiment of the structures, at least the first dielectric layer, or the second dielectric layer, preferably both, are coated with an anti-fouling layer to assist in the establishing the desired microdroplet/carrier fluid/surface contact angle at the various virtual electrowetting electrode locations, and additionally to prevent the contents of the microdroplets adhering to the surface and being diminished as the microdroplet is moved through the chip. If the second wall does not comprise a second dielectric layer, then the second anti-fouling layer may be applied directly onto the second conductor layer. For optimum performance, the anti-fouling layer should assist in establishing a microdroplet/carrier fluid/surface contact angle that should be in the range 70-110° when measured as an air-liquid-surface three-point interface at 25° C. In one embodiment, these layer(s) have a thickness of less than 150 nm and in some cases form a monomolecular layer. In another, these layers are comprised of multilayers of a fluorocarbon-silane, such as Trichloro(1H,1H,2H,2H-perfluorooctyl)silane. Preferably, either or both anti-fouling layers are hydrophobic to ensure optimum performance. In certain embodiments, there is an interstitial layer of silica interposed between the anti-fouling layer and the dielectric layer in order to form a chemically compatible interface between the layers, such a layer is typically less than 10 nm thick.

The first and second dielectric layers, and therefore the first and second walls, define a microfluidic space which is at least 10 μm in width and in which the microdroplets are contained. Preferably this space is from 10 to 180 μm in width. Preferably, before they are contained, the microdroplets have an intrinsic diameter which is more than 10% greater, suitably more than 20% greater, than the width of the microdroplet space. By this means, on entering the chip the microdroplets are caused to undergo compression leading to enhanced electrowetting performance.

In one embodiment, the first and second dielectric layers are coated with an antifouling coating such as fluorosilane. In another embodiment the first and second dielectric layers are coated with a biocompatible coating such as (3-aminopropyl)trimethoxysilane, a layer of deposited protein, collagen, laminin or fibronectin.

In another embodiment, the microfluidic space includes one or more spacers for holding the first and second walls apart by a predetermined amount. Options for spacers include beads or pillars or ridges created from an intermediate resist layer which has been produced by photo-patterning. Various spacer geometries can be used to form narrow channels, tapered channels or partially enclosed channels which are defined by lines of pillars. By careful design, it is possible to use these spacers to aid in the deformation of the microdroplets, subsequently perform microdroplet splitting and effect operations on the deformed microdroplets. The same spacers can be used to guide the flow of fluids in the microfluidic space when filling, priming and emptying the device.

The first and second walls are biased using a source of A/C power attached to the conductor layers to provide a voltage potential difference therebetween; suitably in the range 10 to 150 volts.

These preferred OEWOD structures are activated using a source of electromagnetic radiation having a wavelength in the range 400-1000 nm and an energy higher than the bandgap of the photoexcitable layer. Suitably, the photoactive layer will be activated at the virtual electrowetting electrode locations when the incident intensity of the radiation employed is in the range 0.01 to 0.2 $Wcm^{-2}$. The source of electromagnetic radiation is, in one embodiment, highly attenuated and in another pixelated to produce corresponding photoexcited regions on the photoactive layer which are also pixelated. By this means, pixelated virtual electrowetting electrode locations are induced on the first dielectric layer.

Where the source of electromagnetic radiation is pixelated, it is suitably supplied either directly or indirectly using a reflective screen such as a digital micromirror device (DMD) illuminated by light from LEDs or other lamps. This enables high complexity patterns of virtual electrowetting electrode locations to be rapidly created and destroyed on the first dielectric layer thereby enabling the microdroplets to be precisely steered along essentially any virtual pathway using closely-controlled electrowetting forces. This is especially advantageous where there is a requirement for the chip to manipulate many thousands of such microdroplets simultaneously along multiple pathways. Such electrowetting pathways can be viewed as being constructed from a continuum of virtual electrowetting electrode locations on the first dielectric layer. By using the image output from a video-microscope to simultaneously inspect both the physical microfluidic channels patterned on the microdevice and the pattern of virtual electrowetting electrode locations projected on to the same device, after this inspection the location of the virtual electrowetting patterns can be adapted in order to correctly align with the location of the fluidic channels and transport droplets across the various fluidic channels and flow regions accurately without recourse to mechanical alignment between the microfluidics and the optical projector assembly.

The points of impingement of the source(s) of electromagnetic radiation on the photoactive layer can be any convenient shape including the conventional circular and annulus. In one embodiment, the morphologies of these points are determined by the morphologies of the corresponding pixelations and in another correspond wholly or partially to the morphologies of the microdroplets once they have entered the microfluidic space. In one preferred embodiment, the points of impingement and hence the electrowetting electrode locations may be crescent-shaped and orientated in the intended direction of travel of the microdroplet. Suitably the electrowetting electrode locations themselves are smaller than the microdroplet surface adhering to the first wall and give a maximal field intensity gradient across the contact line formed between the droplet and the surface dielectric. In one embodiment of the OEWOD structure, the second wall also includes a photoactive layer which enables virtual electrowetting electrode locations to also be induced on the second dielectric layer by means of the same or different source of electromagnetic radiation. The addition of a second dielectric layer enables transition of the wetting edge of a given microdroplet from the upper to the lower surface of the structure, if so desired, and the application of greater electrowetting force to each microdroplet.

As mentioned above, the device may further comprise an optical detection system located so that it is interrogating optical phenomena inside the chip or downstream thereof. In one embodiment, it is integral with the chip and is located within a region of zero microdroplet flow. The optical detection system is in one embodiment selected from a brightfield microscope, a darkfield microscope, a means for detecting chemiluminescence, a means for detecting Forster resonance energy transfer and a means for detecting fluorescence. In one preferred embodiment, it is a means to stimulate and detect microdroplet fluorescence and further comprises a detection region, with any associated radiation-transparent detection window; a source of electromagnetic radiation (e.g. visible, infrared or UV light) to illuminate the microdroplets; one or more photodetectors and optionally a microprocessor for receiving a signal from the photodetector(s) and providing assay results or nucleotide sequence information to a user in the form of, for example, a visual display or count. In one embodiment, the optical detection system is designed to detect a characteristic detection property associated with the microdroplets, preferably a fluorescence signal from a reporter molecule (such as a biomarker or a molecular beacon) contained within and which is activated directly or indirectly by interaction or reaction with an analyte being sought.

The device of the invention may further comprise one or more of the following components; (1) a means to generate a medium comprised of an emulsion of aqueous microdroplets in an immiscible carrier fluid such as a fluorocarbon or silicone oil; (2) a means to induce this medium to flow through the chip from an inlet location using e.g. a pneumatic pump or a mechanical injector and (3) a sample preparation region in which an analyte of the type mentioned above or another biomolecule is generated upstream of the inlet from, for example, a patient sample or a cell culture incubator.

As mentioned above, in some cases it is advantageous to resupply cells contained in microdroplets by flowing a carrier phase having a very high saturation capacity for solutes such as carbon dioxide and oxygen, but a relatively low saturation capacity for aqueous materials.

Accordingly, the means (1) for generating the medium may, for example, comprise a medium preparation component for treating the carrier phase in a controlled atmosphere chamber by incubating a vial of the carrier phase in the chamber and agitating it to ensure contact between the liquid and gas phases. This carrier phase can then be transferred to a gas impermeable sealed vessel (such as a glass syringe) and pumped through the microfluidic network as described above in order to replenish carrier phase which has been depleted of dissolved gasses through the respiration of the cells in the microdroplets.

In another example, resupply is achieved by pumping a stream of the carrier phase through a gas-permeable tube or membrane that is exposed to a controlled atmosphere having the desired gas concentrations in an equilibration vessel. Diffusion of gases from the controlled atmosphere into the carrier phase via the membrane brings the carrier phase gas concentration up to the required values. In the flow path beyond the equilibration vessel the permeable tubing is replaced with gas-impermeable tubing such as tubing made of glass, fused silica, poly-ether ether ketone or a composite structure. Such a network ensures a continuous supply of treated carrier phase without requiring batchwise preparation of carrier phase in separate vessels. The gas concentration in the equilibration vessel may be controlled through a close-loop feedback system provided between a gas bleed-in valve and a gas sensor disposed inside the equilibration vessel. The gas bleed valve admits gas to the chamber when the concentration measured by the sensor drops below a critical value. Alternatively, a continuous stream of gas may be caused to flow through the equilibration chamber via a flow regulation controller; the flow rate is chosen such the rate of flow exceeds the rate of gas depletion. The invention is now illustrated by the following.

A device according to the invention and illustrated in FIG. 1 first comprises a microfluidic tube 1 which introduces a fluorocarbon oil into carbonation vessel 2. 2 comprises void 3 connected to gas inlets and outlets 4 so that the gaseous contents of 3 may be maintained at 5% carbon dioxide. The composition of the gas is optionally monitored by carbon dioxide probe 5. The fluorocarbon oil is then caused to flow through the void via gas-permeable tubing 6 thereby enabling the oil to become carbonated. The carbonated oil is then passed via microfluidic tubing 7 to selector valve 8. Also fed to 8 is fed an emulsion of aqueous microdroplets 9 at least some of which may contain a cell which a user of the device is seeking to manipulate and detect. 8 is further connected to microfluidic tubing 10 which depending on the setting of 8 may contain the emulsion, the fluorocarbon oil or a mixture of the two.

10 is connected to microdroplet manipulation unit 11 comprising flow channel 12 provided with a pathway of OEWOD virtual electrodes (not shown) and holding zone 13. In use, microdroplet flowing through 12 to output 13 can be selectively displaced from 12 into 13 by application of directional electrowetting forces at entry points 14. Within 13 the microdroplets can be held at electrowetting receiving locations (not shown) whilst the fluorocarbon oil flows across them. Under these conditions, cells within the microdroplets can then be efficiently cultured at a holding point. At the end of the process, the microdroplets are removed from 13 back into 12 where they then flow to 15 and are recovered for further processing or analysis.

The invention claimed is:

1. A device for manipulating microdroplets comprising a microfluidic chip adapted to receive and manipulate microdroplets dispersed in a carrier fluid, the device comprising: a flow channel adapted to receive microdroplets dispersed in a flowing carrier fluid, and a holding zone in which the microdroplets are held in a stationary position by an optically mediated electrowetting force within a flowing stream of the carrier fluid; wherein the flow channel is provided with a pathway of optoelectrowetting on dielectric (OEWOD) virtual electrodes to enable manipulation of microdroplets by selective displacement into the holding zone; and wherein the stream of carrier fluid contains dissolved within gases, nutrients, biomolecules or other chemical reagents.

2. The device of claim 1, further comprising a means for transferring microdroplets into and out of the holding zone.

3. The device of claim 1, wherein the stream of carrier fluid containing the dissolved within gases, nutrients, biomolecules or other chemical reagents provides biological cells encapsulated inside the microdroplets with a local environment that promotes cellular proliferation.

4. The device of claim 1, wherein the chip is comprised of at least one optoelectrowetting on dielectric (OEWOD) structure consisting essentially of:

- a first composite wall comprised of:
  - a first substrate
  - a first transparent conductor layer on the substrate having a thickness in the range 70 to 250 nm;
  - a photoactive layer activated by electromagnetic radiation in the wavelength range 400-1000 nm on the first transparent conductor layer having a thickness in the range 300-1500 nm and
  - a first dielectric layer on the photoactive layer having a thickness in the range 30 to 160 nm;
- a second composite wall comprised of:
  - a second substrate;
  - a second conductor layer on the substrate having a thickness in the range 70 to 250 nm and
  - optionally a second dielectric layer on the second conductor layer having a thickness in the range 30 to 160 nm wherein the exposed surfaces of the first and second dielectric layers are disposed less than 180 μm apart to define a microfluidic space adapted to contain microdroplets;
- an A/C voltage source to provide a voltage across the first and second composite walls connecting the first and second conductor layers;
- at least one source of electromagnetic radiation having an energy higher than the bandgap of a photoexcitable layer adapted to impinge on the photoactive layer to induce corresponding virtual electrowetting locations on the surface of the first dielectric layer and
- means for manipulating the points of impingement of the electromagnetic radiation on the photoactive layer to vary the disposition of the virtual electrowetting locations thereby creating at least one electrowetting pathway along which the microdroplets may be caused to move.

5. The device of claim 4, wherein the first and second composite walls further comprise first and second anti-fouling layers on respectively the first and second dielectric layers.

6. The device of claim 5, wherein the first and second anti-fouling layers on the first and second dielectric layers are hydrophobic.

7. The device of claim 4, wherein the microfluidic space is further defined by a spacer attached to the first and second dielectric layers.

8. The device of claim 4, wherein the electrowetting pathway is comprised of a continuum of virtual electrowetting locations each of which can be subject to OEWOD during use of the device.

9. The device of claim 4, wherein the microfluidic space is from 10 to 180 μm in at least one dimension.

10. The device of claim 4, wherein the source(s) of electromagnetic radiation comprise a pixelated array of light reflected from or transmitted through such an array.

11. The device of claim 4, further comprising an optical detection system for detecting a detection signal from the microdroplets located within the chip or downstream thereof.

12. The device of claim 4, further comprising a means to induce a flow of a medium comprised of an emulsion of aqueous microdroplets or an immiscible carrier fluid through the microfluidic chip from an inlet thereto.

13. The device according to claim 1, wherein the holding zone comprises an entry point through which microdroplets can be selectively displaced from the flow channel into the holding zone.

* * * * *